United States Patent [19]

Kaneko

[11] Patent Number: 4,798,355
[45] Date of Patent: Jan. 17, 1989

[54] FISHING REEL
[75] Inventor: Kyoichi Kaneko, Tokyo, Japan
[73] Assignee: Daiwa Seiko Inc., Tokyo, Japan
[21] Appl. No.: 28,098
[22] Filed: Mar. 19, 1987
[30] Foreign Application Priority Data
  Apr. 11, 1986 [JP] Japan .............................. 61-54397[U]
[51] Int. Cl.⁴ .............................................. A01K 89/00
[52] U.S. Cl. ..................................... 242/218; 242/220
[58] Field of Search ................................. 242/211-221
[56] References Cited
  U.S. PATENT DOCUMENTS
  4,014,422  3/1977  Morishita ............................ 242/212
  4,341,366  7/1982  Kawada ............................... 242/220
  4,406,427  9/1983  Murakami ........................... 242/218
  4,564,158  1/1986  Moosberg ........................... 242/220
  4,593,869  6/1986  Yasui ................................... 242/220

FOREIGN PATENT DOCUMENTS
  60-78526   5/1985  Japan .
  60-131169  9/1985  Japan .

Primary Examiner—Stuart S. Levy
Assistant Examiner—Katherine Matecki
Attorney, Agent, or Firm—Browdy and Neimark

[57] ABSTRACT

A fishing reel apparatus having oppositely disposed bearings in which a tension coil spring is attached to a pivoting plate which is disposed between a clutch cam for engaging or disengaging the clutch and an operation member which is pressed down by the user to release the line. The pivoting plate is bidirectionally energized biased by the tension coil spring so that the pivoting plate pivotally moves to rotate the clutch cam. The directions of this pivotal movement is reversed opposite to one another relative to the dead point of the spring.

3 Claims, 4 Drawing Sheets 4,798,355

FISHING REEL

BACKGROUND OF THE INVENTION

1. Field of the Invention

This invention relates to an improvement in a device for locking and releasing the clutch of a fishing reel, specifically a type of fishing reel apparatus having oppositely disposed bearings whereby operations for locking or releasing the clutch can be effected smoothly and stably, and whereby the durability of a spring adapted for energizing a clutch cam bi-directionally is improved.

2. Description of the Prior Art

Generally, in the arrangement of a device for locking and releasing the clutch of a fishing spinning reel, an engaging portion is disposed around a spool shaft fixedly connected to a spool which is rotated in a linked relationship with the shaft of a handle, the engaging portion being engageable and disengagable with the spool. The spool is retained in a position for winding a line when engaged with the engaging portion, and it is retained in a position for releasing the line when disengaged. An example of this type of device for locking and releasing a clutch has previously been disclosed in Japanese Utility Model Laid-Open No. 131169/1985 in which a pinion is detached from the spool shaft when a clutch cam disposed around the spool shaft is rotated through the medium of a clutch lever by an operation which involves pressing an operation member that laterally extends between side plates of the spool disposed at the rear of the spool, the pinion engaging with the spool shaft when the clutch cam is rotated in the reverse direction by the rotation of the shaft of the handle.

Another example of this type of device is disclosed in Japanese Patent Laid-Open No. 78526/1985 in which, in the locking and releasing operation such as described above, a pinion is detached from the spool shaft allowing the spool to freely rotate only when an operation member is pressed, the pinion engaging with the spool shaft when the operation member is released from the pressed state to immediately restore the position of the spool for the purpose of winding up the line, thus facilitating the so-called flip fishing.

All of the above-described arrangements in which a torsion spring is directly coupled with the clutch cam is defective in the aspects listed below.

(1) The energizing force of the torsion spring causes a force which acts to distort a portion into which the clutch cam is fitted. This force causes frictional drag at this portion and reduces the stability with which the clutch cam is supported, so that the clutch cam can not be smoothly operated.

(2) It is difficult to incorporate the torsion spring into the assembly and there is a risk of it being deformed in the assembly process.

(3) The torsion spring is not durable and tends to break after repeated use. In particular, the use of a torsion spring of this type is not preferable for a fishing apparatus used in, e.g., bait casting, during the course of which the clutch is frequently latched and released.

(4) The contact between the torsion spring and a support plate for the same, and between the torsion spring and the clutch cam also causes friction large enough to obstruct smooth movement of the clutch cam.

SUMMARY OF THE INVENTION

An object of the present invention is to solve these problems of the prior art and to provide a reel apparatus in which the operations of the clutch portions are effected smoothly.

Another object of the present invention is to provide a reel apparatus in which a coil spring can be easily incorporated in the assembly process, thereby facilitating the assembly work.

Still another object of the present invention is to provide a reel apparatus which can be effectively used without causing any damaging stress with respect to any of the parts, especially in bait casting operations during the course of which the clutch is frequently locked and unlocked.

The present invention provides in one of its aspects a reel apparatus having oppositely disposed bearings in which a tension coil spring is attached to a pivoting plate disposed between a clutch cam and an operation member such that the pivoting plate is energized to pivotally move in opposite directions relative to the dead point thereof, thereby reducing the frictional drag of the clutch cam caused by the energizing force of the spring as compared with a conventional type of device having a torsion spring directly coupled with a clutch cam and eliminating frictional contact between the coil spring and a support member for the same, and between the coil spring and an engaging portion of the pivoting plate.

DETAILED DESCRIPTION OF THE PREFERRED EMBODIMENTS

Figure 1:
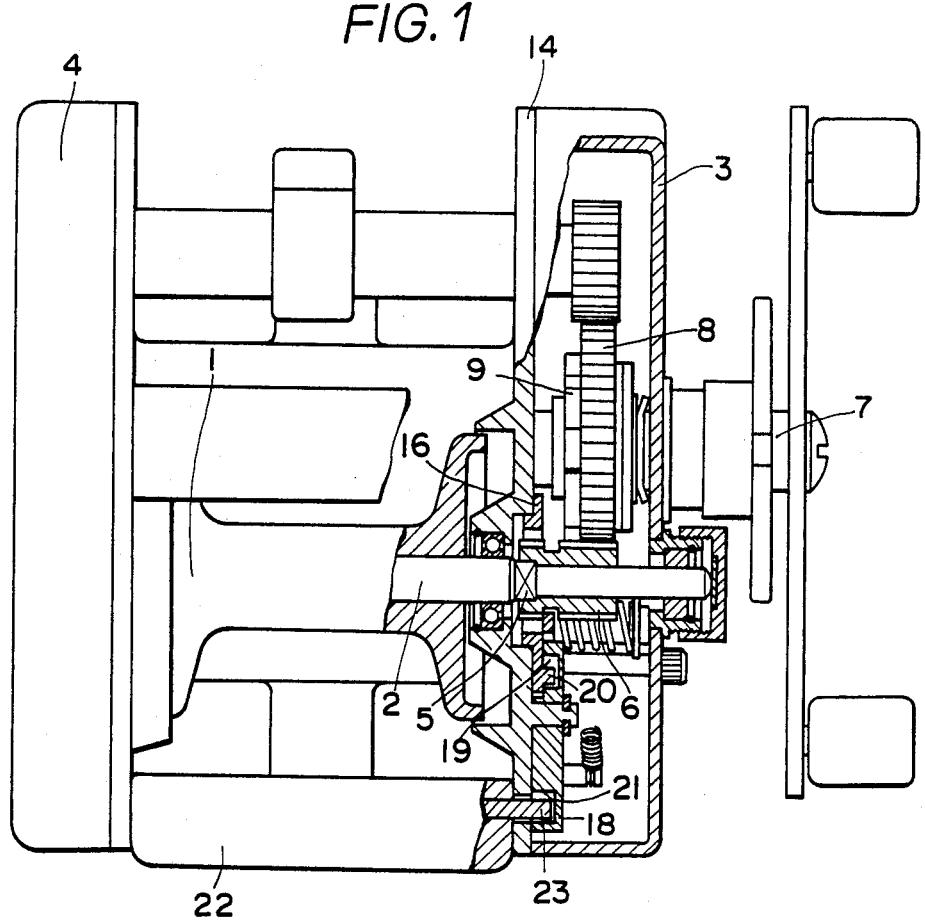
FIG. 1 is a plan view of a reel which represents an embodiment of the present invention which is partially cut away.
Figure 2:
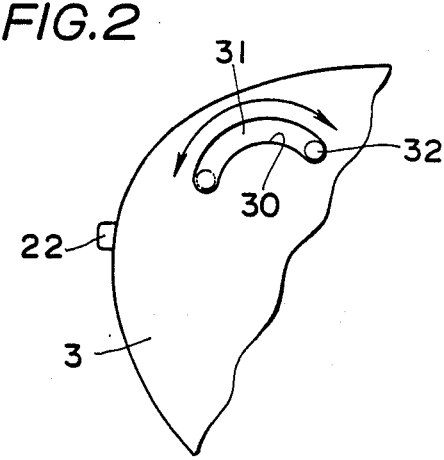
FIG. 2 is a side view of a part of the arrangement in accordance with the present invention.

An embodiment of the present invention will be described in detail with reference to the accompanying drawings.

A spool shaft 2 to which a spool 1 is fixedly connected is supported between side plates 3 and 4 of the reel. A pinion 6 is detachably fitted to an engaging portion 5 formed on the spool shaft 2 on the side of the side plates 3 and is engaged with a driving gear 8 which is disposed around a handle shaft 7. A ratchet wheel 9 has projecting kick pins 10 and is fixedly connected to the handle shaft 7.

A pair of studs 11 are protrusively formed on a support plate 14 which is fixed to the inner side of the side plate 3, and the spool shaft 2 passes through this support plate between the studs 11. A clutch piece 13 which is fitted to and supported by the studs 11 and which is biased by springs 12 toward the support plate 14 engages with the pinion 6 and contacts a clutch cam 16 which is fitted into and supported by the support plate 14 around the spool shaft 2 and which has a pair of oppositely disposed cam portions 15. As the clutch cam 16 rotates and the cam portions 15 contact the clutch piece 13, the pinion 6 is moved against the springs 12 and detached from the engaging portion 5 of the spool shaft 2.

One end of the pivoting plate 18 supported by a support shaft 17 on the support plate 14 and engages at its engaging recess 19 with an engaging pin 20 of the clutch cam 16, and the other end of the pivoting plate 18 engages at its engaging recess 21 with a support pin 23 of an operation member 22 which extends between the side plates 3 and 4 at the rear of the spool 1. The support pin 23 is fitted into a guide hole 24 formed in the support plate 14 so that the operation member 22 can be moved upwardly and downwardly.

A kick plate 27 having an aperture 25 for sliding movement is slidably fitted to one of the studs 11 for supporting the clutch piece 13. The kick plate 27 is pulled by a spring 26 so that the kick plates 27 is energized to place its top end in the locus of the rotation of the kick pins 10.

Figure 3:
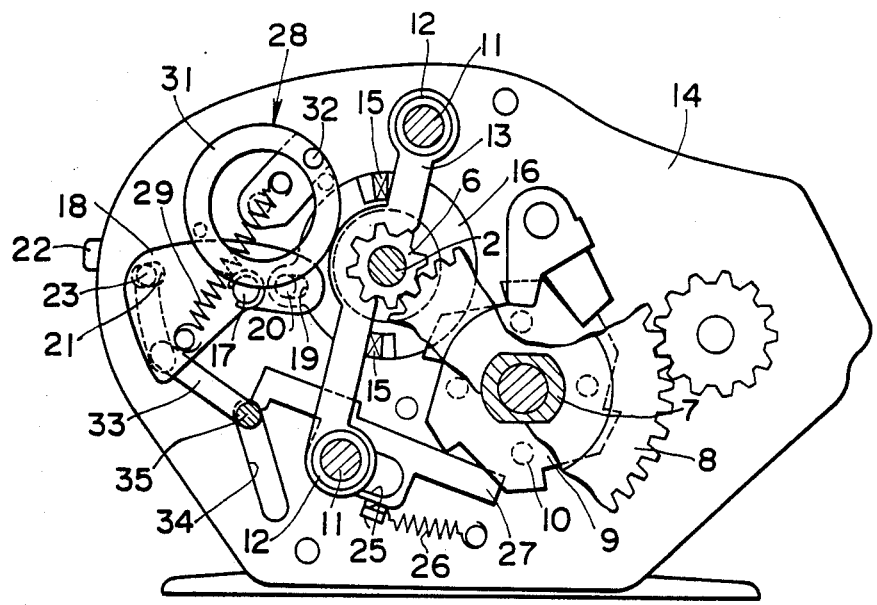
FIG. 3 is a side view of the arrangement of the present invention in the state of winding up the line in which a side plate and some other parts are omitted.
Figure 5:
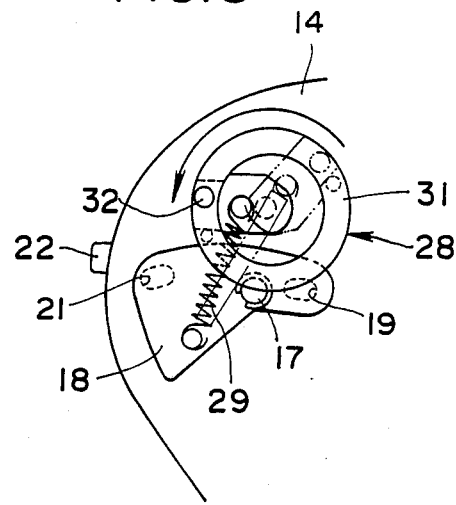
FIGS. 5 and 6 are side views of a part of the arrangement of the present invention when the reel is changed into a flip fishing mode.
Figure 6:
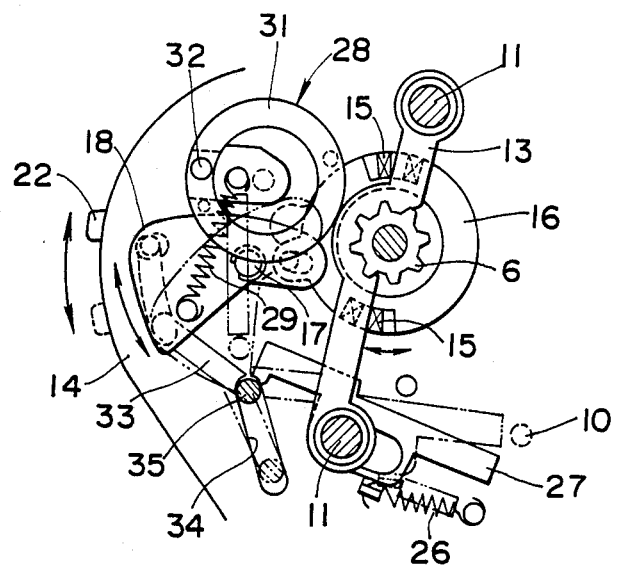
Figure 7:
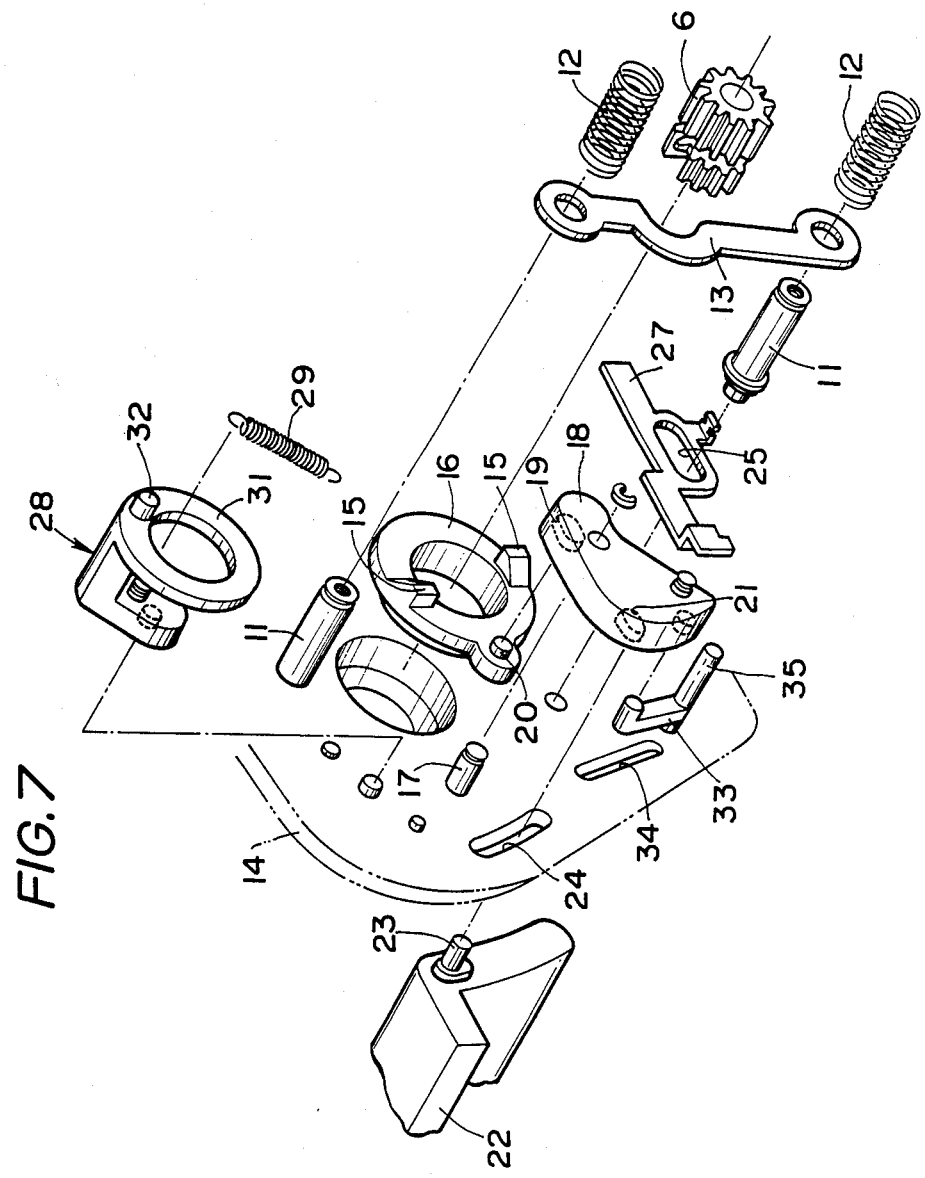
FIG. 7 is an exploded view in perspective of the essential parts of the arrangement of the present invention.

A change-over member 28 which partially overhangs the pivoting plate 18 is rotatably supported on the support plate 14. A tension coil spring 29 is stretched between the change-over member 28 and the pivoting plate 18. When the change-over member 28 is in one of the change-over positions such as shown in FIG. 3, the coil spring 29 biases the pivoting plate 18 to pivot while reversing the direction of the pivotal movement of the pivoting plate 18 relative to the support shaft 17. When the change-over member 28 is in the other change-over position such as shown in FIG. 5, the coil spring 29 energizes the pivoting plate 18 to rotate constantly in the clockwise direction, namely, in the direction of energizing the operation member 22 to an upper position in the guide hole 24.

The change-over member 28 has an annular seat plate 31 which slidingly contacts a portion around a circular-arc aperture 30 formed in the side plate 3 and which closes this circular-arc aperture. The change-over member 28 also has a knob 32 which is protrusively formed on the annular seat plate 31 and which is fitted into the circular-arc aperture 30 to protrude therebeyond. One end of a guide rod 33 connected to the pivoting plate 18 is engaged with a guide hole 34 which is formed generally vertically in the support plate 14, thereby guiding the pivotal movement of the pivoting plate 18. An engaging rod 35 is protrusively formed at the other end of the guide rod 33. This engaging rod 35 engages with the base end of the kick plate 27 and pivotally moves the kick plate 27 in the clockwise direction about the stud 11, thereby retaining the top of the kick plate 27 out of the locus of the rotation of the kick pins 10, when the guide rod 33 is in an upper position in the guide hole 34.

Figure 4:
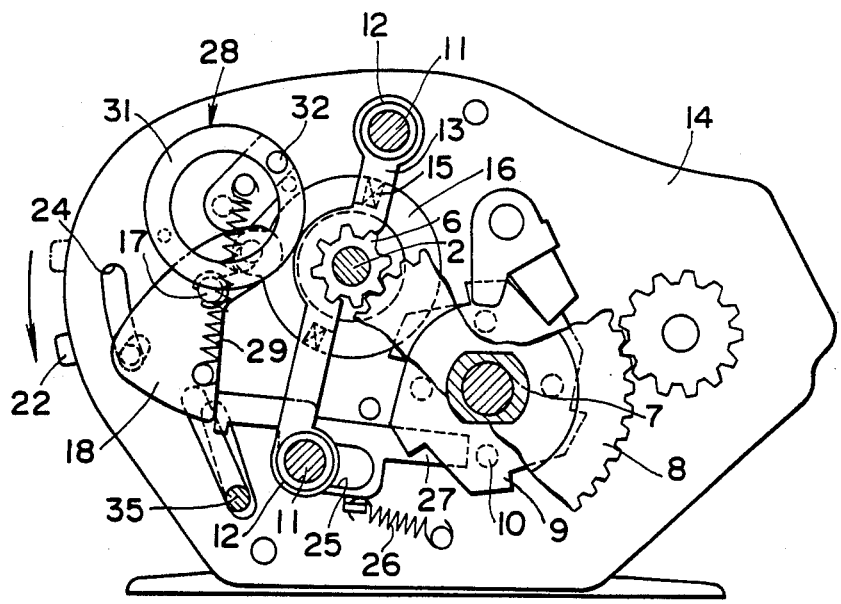
FIG. 4 is a side view of the arrangement of the present invention in the state of releasing the line in which the side plate and some other parts are omitted.

The embodiment of the present invention in thus constituted. When the line is released in an ordinary fishing operation, the operation member 22 is downwardly pressed while maintaining the changeover member 28 in the change-over position shown in FIG. 3, and the pivoting plate 18 is pivotally moved in a counterclockwise direction. After passing the support shaft 17, the coil spring 29 urges the pivoting plate 18 in a counterclockwise direction, and the clutch cam 16 is rotated so that the cam portions 15 press the clutch piece 13 to detach the pinion 6 from the engaging portion 5 of the spool shaft 2. The apparatus is thereby maintained in the position for releasing the line such as shown in FIG. 4. Meanwhile, the guide rod 33 is moved to a lower position in the guide hole 34, and the base end of the kick plate 27 is released from the engaging rod 35 so that the top end of the kick plate 27 is retained in the locus of the rotation of the kick pins 10.

When, in this state, the handle shaft 7 is rotated, the kick pin 10 of the ratchet wheel 9 engages with the kick plate 27 and backwardly moves the same, and the rear end of the kick plate 27 presses and pivotally moves the pivoting plate 18 in the clockwise direction. After the coil spring 29 has passed the support shaft 17, the pivoting plate 18 is returned to the position shown in FIG. 3, and the engaging rod 35 engages with and presses the base end of the kick plate 27, thereby retaining the top end of the kick plate 27 out of the locus of the rotation of the kick pins 10. Simultaneously, the cam portions 15 of the clutch cam 16 are detached from the clutch piece 13, and the springs 12 act to connect the pinion 6 to the engaging portion 5 of the spool shaft 2. The apparatus is thereby returned to the position for winding up the line.

At the time of flip fishing, the change-over member 28 is rotated and changed from the position indicated by the chain line in FIG. 5 to the position indicated by the solid line, and the operation member 22 is pressed downwardly. Then, the pivoting plate 18 pivots in the same manner as described above, and the cam portions of the clutch 16 are released from the clutch piece 13, thereby detaching the pinion 6 from the engaging portion 5 of the spool shaft 2, so that the apparatus assumes the position of releasing the line. However, in this state, the coil spring 29 constantly pulls and urges the pivoting plate 18 in the clockwise direction even after the operation member 22 has been pressed down to a lower position. Accordingly, if in this state the pressing operation of the operation member is stopped, the pivoting plate 18 is automatically returned to the position shown in FIG. 5, and the cam portions 15 of the clutch cam 16 are released from the clutch piece 13. The pinion 6 is then connected to the engaging portion 5 of the spool shaft 2, the apparatus being maintained in the position for winding up the line.

Accordingly, by repeating the pressing operation of the operation member 22, it is possible to effect the flipping operation while alternately changing the modes of winding up and releasing the line.

In the above-described embodiment, the upper end of the coil spring 29 is engaged with the changeover member 28 in order that the apparatus may be changed into the mode of flip fishing. If this mode is not necessary, the upper end of the coil spring 29 is directly attached to the support plate 14.

As described above, in the apparatus in accordance with the present invention, the pivoting plate is pivotally supported between the operation member and the clutch cam; the coil spring for energizing the pivoting plate in opposite directions relative to the support shaft of the pivoting plate is attached to pivoting plate instead of providing a dead point spring for the clutch cam; and the urging force of the coil spring is prevented from directly acting on the clutch cam. By the effect of this arrangement, the clutch cam can smoothly operate, and the frictional drag at the attachment portion of the coil spring is limited to a minimum level, thus facilitating the clutch operation.

Since the present invention employs a coil spring instead of a torsion spring, there is no risk of breakage of the spring even after repeated use of the apparatus, thus improving the durability. Also, it is possible for the spring to be easily incorporated in the apparatus in the assembly process. The function of the apparatus can be easily changed for flip fishing. The apparatus in accordance with the present invention is thus highly practical and superior in performance.

What is claimed is:

1. A fishing reel having oppositely disposed bearings, a handle and a shaft connected to the handle, said reel comprising:

a spool shaft having an engagement portion; a spool fixedly connected to the spool shaft;

left and right side plates of said reel for rotatably supporting the spool shaft;

a pinion detachably fitted to the engagement portion of said spool shaft;

a driving gear disposed on the shaft of the handle and engaged with said pinion;

a clutch piece engaged with said pinion;

a spring for biasing said clutch piece to engage said pinion with said engagement portion of said spool shaft;

a clutch cam rotatably disposed around said spool shaft and rotated therearound so as to press said clutch piece in the direction of an axis of said spool shaft and detach said pinion forms aid engagement portion of said spool shaft;

an operation member;

a pivoting plate, pivotally mounted on one of the side plates at a rear end portion thereof and having one side which is connected to said clutch cam for movement relative thereto and another side which is connected to the operation member;

a tension coil spring connected to said pivoting plate and to said one side plate for bi-directionally biasing and pivotally moving said pivoting plate in pivoting directions which are opposite to one another relative to a dead point of said tension coil spring;

a kick member disposed on said handle shaft;

a kick plate moved by the kick member to engage with and pivotally move said pivoting plate until said pivoting plate passes the dead point of said tension coil spring; and means for ordinarily retaining said kick plate out of a locus of said kick member, said means retaining said kick plate in the locus of said kick member during a clutch-disengaging period.

2. A fishing reel having oppositely disposed bearings, a handle and a shaft connected to the handle, said reel comprising:

a spool shaft having an engagement portion;

a spool fixedly connected to the spool shaft;

left and right side plates of said reel for rotatably supporting the spool shaft;

a pinion detachably fitted to the engagement portion of said spool shaft; a driving gear disposed on the shaft of the handle and engaged with said pinion;

a clutch piece engaged with said pinion;

a spring for biasing said clutch piece to engage said pinion with said engagement portion of said spool shaft;

a clutch cam rotatably disposed around said spool shaft and rotated therearound so as to press said clutch piece in the direction of an axis of said spool shaft and detach said pinion from said engagement portion of said spool shaft;

an operation member;

a pivoting plate, pivotally mounted one of the side plates at a rear end portion thereof and having one side which is connected to said clutch cam for movement relative thereto and another side which is connected to the operation member;

a tension coil spring having a first end connected to said pivoting plate for bi-directionally biasing and pivotally moving said pivoting plate in pivoting directions which are opposite to one another relative to a dead point of said tension coil spring;

a movable change-over member for supporting an upper second end of said coil spring at a first position wherein said pivoting plate is pulled and biased by said tension coil spring to pivot in only one direction which causes said clutch cam to allow engagement of said pinion with said engagement portion of said spool shaft, or at a second position wherein said pivoting plate is bidirectionally pulled and biased by said tension coil spring;

a kick member disposed on said handle shaft;

a kick plate moved by the kick member to engage with and pivotally move said pivoting plate until said pivoting plate passes the dead point of said tension coil spring; and means for ordinarily retaining said kick plate out of a locus of said kick member, said means retaining said kick plate in the locus of said kick member during a clutch-disengaging period.

3. A fishing reel having oppositely disposed bearings according to claim 2, further comprising means for rotating said change-over member to change the position of the upper end of said coil spring at which said coil spring is supported.

* * * * *